US012137792B2

(12) United States Patent
Charcas

(10) Patent No.: US 12,137,792 B2
(45) Date of Patent: Nov. 12, 2024

(54) THERMALLY INSULATED SOLAR RECHARGEABLE BACKPACK

(71) Applicant: Esperanza Charcas, Manvel, TX (US)

(72) Inventor: Esperanza Charcas, Manvel, TX (US)

( * ) Notice: Subject to any disclaimer, the term of this patent is extended or adjusted under 35 U.S.C. 154(b) by 0 days.

(21) Appl. No.: 17/545,649

(22) Filed: Dec. 8, 2021

(65) Prior Publication Data
US 2022/0175117 A1    Jun. 9, 2022

Related U.S. Application Data

(60) Provisional application No. 63/122,556, filed on Dec. 8, 2020.

(51) Int. Cl.
*A45F 3/04* (2006.01)
*H02J 7/00* (2006.01)
*H02J 7/35* (2006.01)
*A45F 3/00* (2006.01)

(52) U.S. Cl.
CPC .............. *A45F 3/04* (2013.01); *H02J 7/0048* (2020.01); *H02J 7/35* (2013.01); *A45F 2003/003* (2013.01)

(58) Field of Classification Search
CPC ............................. A45F 2003/003; A45F 3/04
See application file for complete search history.

(56) References Cited

U.S. PATENT DOCUMENTS

| | | | | |
|---|---|---|---|---|
| 4,846,257 A * | 7/1989 | Wallace | ................ | F25D 31/005 62/223 |
| 5,676,295 A * | 10/1997 | Gelb | ........................ | A45F 3/04 224/628 |
| 7,475,889 B2 * | 1/2009 | Marmah | ................... | A47C 1/14 297/188.1 |
| 2005/0140331 A1 * | 6/2005 | McQuade | ............... | A45C 15/00 320/101 |
| 2008/0121630 A1 * | 5/2008 | Simard | ................... | A45C 11/20 220/592.2 |
| 2008/0210728 A1 * | 9/2008 | Bihn | ......................... | A45F 3/04 320/101 |
| 2012/0286718 A1 * | 11/2012 | Richards | ................... | A45F 3/04 320/103 |
| 2015/0326044 A1 * | 11/2015 | Ashley | .................. | H02J 7/0042 320/103 |
| 2016/0020640 A1 | 1/2016 | Rogers | | |
| 2019/0133303 A1 * | 5/2019 | Thiel | ......................... | H02J 7/34 |

* cited by examiner

*Primary Examiner* — Scott T McNurlen
(74) *Attorney, Agent, or Firm* — Boudwin Intellectual Property Law, LLC; Daniel Boudwin

(57) ABSTRACT

A thermally insulated solar rechargeable backpack is provided. The device includes a plurality of compartments that are thermally insulated. The plurality of compartments may keep items placed therein either hot or cold. The backpack includes a plurality of zippers to maintain the temperature in the compartments and keep the contents from falling out of the backpack. Additionally, the sides of the backpack have at least one storage pocket. Moreover, a solar panel is disposed on the top of the backpack to power a plurality of USB charging ports for charging electronic devices. In this way, the insulated backpack may be utilized to thermally insulate items to keep them either hot or cold in separate compartments during their transportation and utilize solar energy to provide power through a plurality of charging ports.

17 Claims, 5 Drawing Sheets

THERMALLY INSULATED SOLAR RECHARGEABLE BACKPACK

CROSS REFERENCE TO RELATED APPLICATIONS

This application claims the benefit of U.S. Provisional Application No. 63/122,556 filed on Dec. 8, 2020. The above identified patent application is herein incorporated by reference in its entirety to provide continuity of disclosure.

BACKGROUND OF THE INVENTION

The present invention relates to a backpack. More specifically, the present invention provides a backpack that includes a plurality of compartments that are structured to accommodate foods of both warm and cold temperature and a plurality of USB ports powered by a solar panel.

Individuals utilize backpacks to easily transport items to a desired location. With the ability to place the backpack over their shoulders, there is limited hassle in transporting the backpack and its contents therein from one location to another. Moreover, individuals have free range of their arms when wearing a backpack. This allows them to carry any additional items in their free arms. However, most backpacks are unable to maintain the temperature of food and beverages stored within its compartments. Currently available backpacks that do provide temperature controlled storage compartments often make the user choose if they want to keep the contents either hot or cold. The available backpacks are unable to accommodate a user who wants to keep some items therein hot and other items therein cold at the same time. Additionally, when individuals pack food for their workday, for example construction workers, they commonly place their food in a communal refrigerator, or they must spend a portion of their limited eating time waiting to use communal appliances to heat up their food. Providing these workers with a device that maintains the desired consumption temperature of food items from the time they are placed within the device until the food is consumed, will allow the workers to not use any communal appliances.

Moreover, if people who pack food to go on extended trips outdoors want to have any combination of hot and cold temperatures for their food and beverages, they will have to carry multiple backpacks or storage containers. However, when people take trips outdoors in the wilderness or at a park, they often want to carry as few items as possible to easily maneuver around. A device that allows an individual to carry both warm food or drinks and cold food or drinks to be carried in the same device without the temperature of the food or drinks being altered, will limit the need to utilize any additional devices.

With the navigational ability of current electronic devices and the ability to call someone if in distress, an electronic device is an important tool for individuals who go on outdoor trips. Moreover, having a means to maintain the battery life for the electronic device is critical. Typically, people have limited access to a power supply for charging electronic devices when they are outdoors. Since power outlets are scarcely available to individuals while outdoors, an alternative power source for charging electronic devices will be helpful for the individual while they are outdoors. One power source that may be readily available while outdoors is solar power. However, most types of backpacks for the outdoors do not have the ability to harness solar power for the purposes of charging electronic devices or any other need. This causes individuals to carry an additional solar power charging device, occupy valuable space within their backpack or any other carrying device.

Therefore, there is a defined need amongst the known prior art references for a backpack that allows for both hot and cold food items to be properly stored within one device at the same time and can concert a reusable energy, such as solar power, to provide a power source for charging a user's electronic device.

SUMMARY OF THE INVENTION

In view of the foregoing disadvantages inherent in the known types of backpacks now present in the known art, the present, invention provides a new insulated backpack wherein a plurality of compartments structured to accommodate for foods and drinks of both warm and cold temperatures at the same time and a solar panel that converts solar energy into a reusable energy for charging electronic devices.

The present device comprises a pair of storage compartments. Specifically, the device includes an upper storage compartment and a lower storage compartment. The pair of storage compartments are thermally insulated. Each storage compartment, provides an environment where food or drinks placed therein can maintain their desired temperature. The thermally insulated property of each storage compartment prevents any outside temperature from affecting the temperature within the storage compartment, and thus not altering the temperature of items placed therein. Moreover, the pair of storage compartments are independent from one another. For example, if the user wants to use the upper storage compartment to place food or drinks that they want to remain cold and they want to use the lower storage compartment to place food or drinks that they want to remain hot, or vise a versa, each storage compartment may maintain the desired temperature without disturbing the other storage compartment. This will allow for a user to use a single device to transport both warm and cold items.

The present invention also comprises a solar panel operably connected to a power source. The solar panel is disposed on a top face of the device to optimise the amount of solar energy that is absorbed from the rays of the sun. The solar energy absorbed is converted to a usable energy and is stored in a power source within the device. The user may insert a USB compatible power cord into one of a plurality of USB ports disposed on the device. This will allow an electronic device to receive a power charge. The power stored within the power source enables an individual to utilize the power absorbed from the solar panels to charge an electronic device via a USB compatible power cord. This ability will allow an individual to use their electronic device when they are in a situation that may require its use, even when the battery of the electronic device is depleted and there is not an alternative means for charging.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
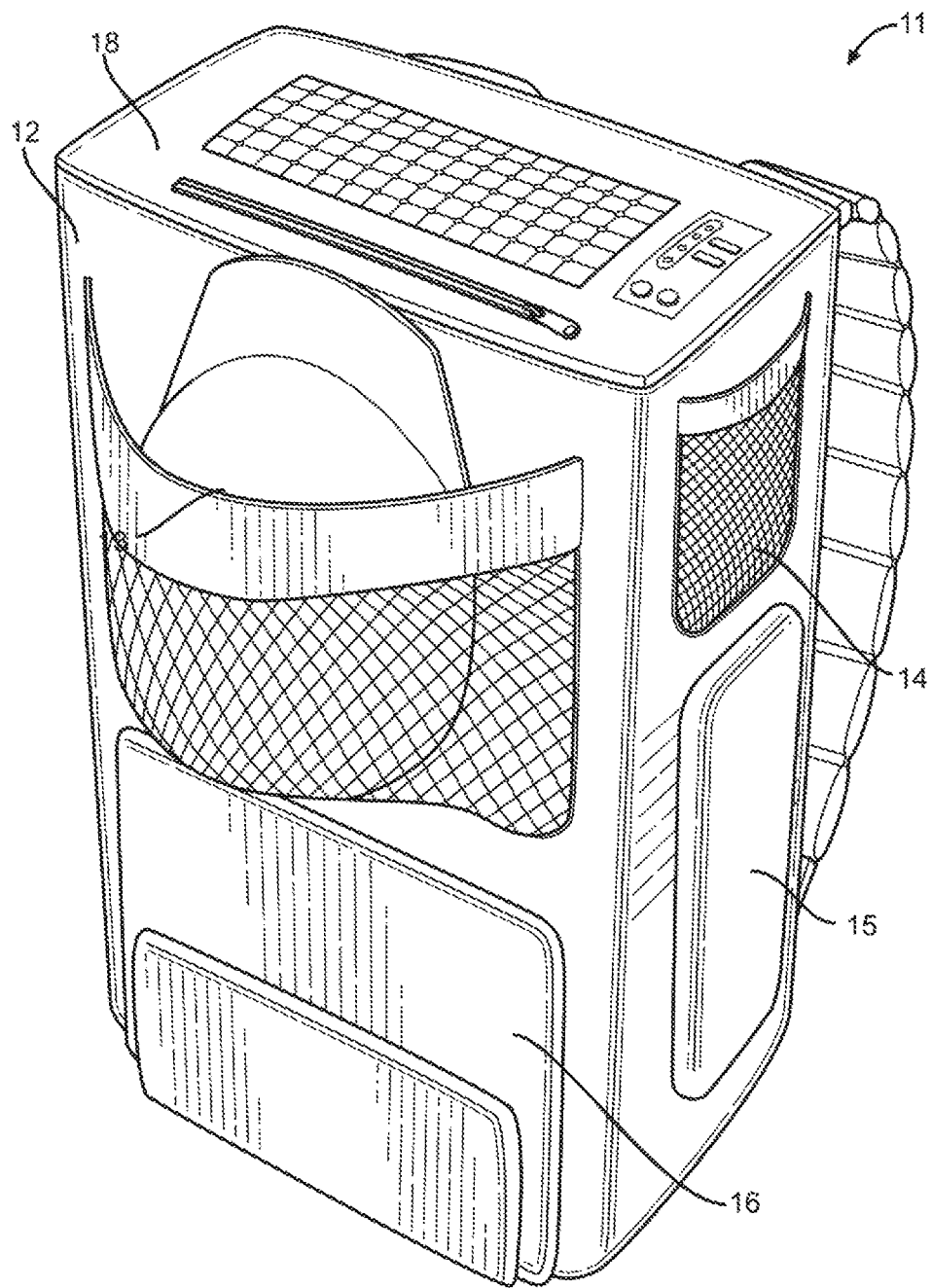
FIG. 1A shows a perspective front view of an embodiment of the insulated backpack.

Reference is made herein to the attached drawings. Like reference numerals are used throughout the drawings to depict like or similar elements of the insulated backpack. The figures are intended for representative purposes only and should not be limiting in any respect.

FIG. 1A shows a perspective front view of an embodiment of an insulated backpack. The insulated backpack 11 comprises a body 12. The body 12 includes a front face, a rear face, a pair of side faces, a top face 18, and a bottom face. The body 12 is a generally vertical body or the like. The body 12 is composed of a flexible material to accommodate for items of varying sizes. The top face 18 of the body 12 is partially removable from the front face and the pair of side faces. A plurality of storage pockets is disposed on the front face and the pair of side faces of the body 12. A front face storage pocket 13 extends a width of the front face. The width of the front face is the distance on the front face from the pair of side faces. In the shown embodiment, the front face storage pocket 13 has a mesh body and a stretchable lip. The stretchable lip accommodates for varying items that are placed within the front face storage pocket 13. At least one side face storage pocket 14 extends a width of the side face. The width of the side face is the distance on the side face from the front face to the rear face. In the shown embodiment, the at least one side face storage pocket 14 has a mesh body and a stretchable lip. The stretchable lip accommodates for varying items that are placed within the front face storage pocket 14. A front compartment 16 is disposed on the front face of the body 12. The front compartment 16 defines a lower storage compartment. The lower storage compartment provides an interior volume for storing of desired items.

The body 12 is composed from a thermally insulated material. The external side of the body 12 is composed of a waterproof material with a protectant rubberized rugged material on the bottom face. Additionally, a side compartment 15 is disposed on the side face of the body 12. The side compartment 15 includes a covering. The covering secures the items place within the side compartment 15. The covering can be selectively detached via a fastener attachment.

Figure 1B:
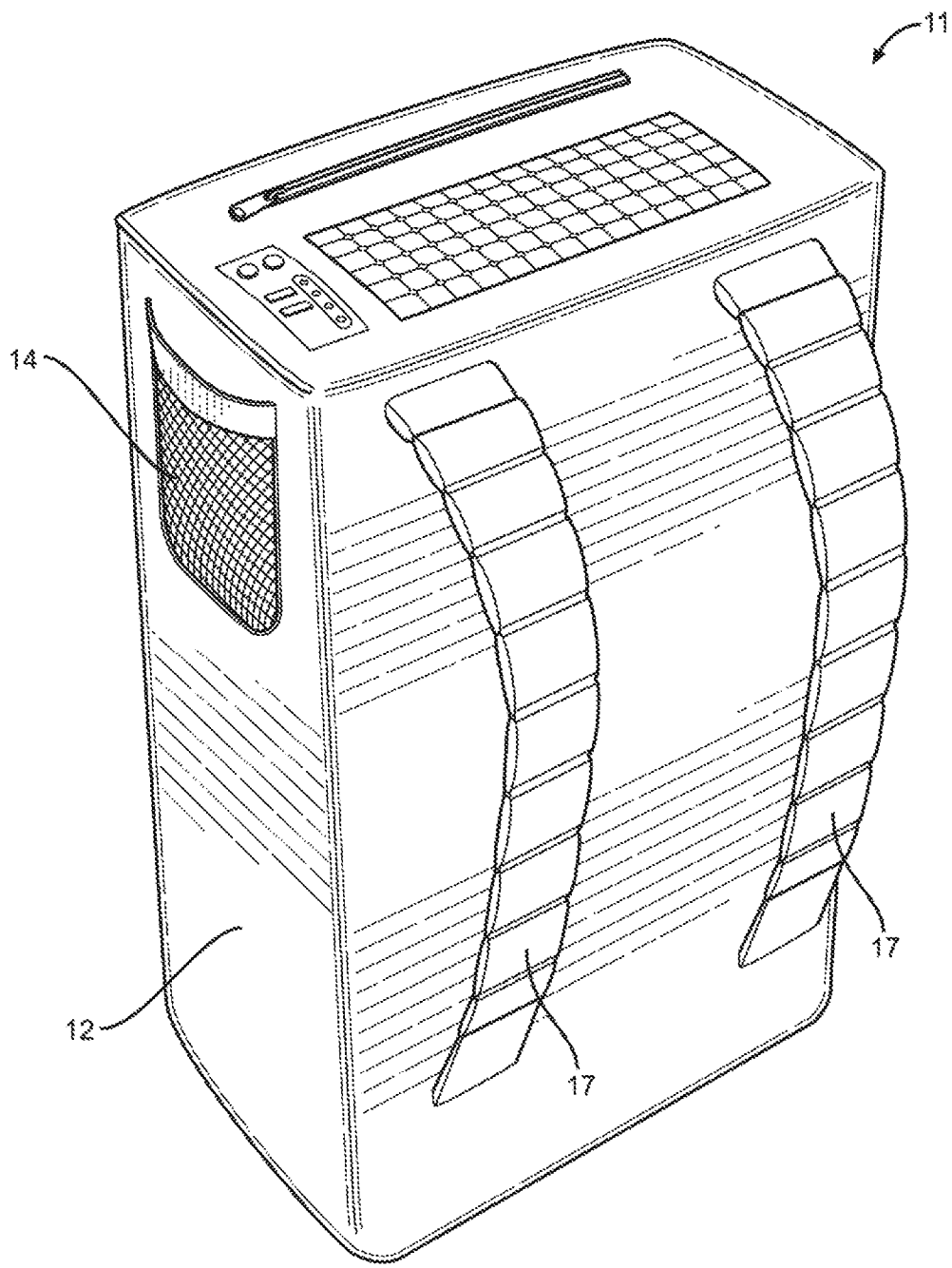
FIG. 1B shows a perspective rear view of an embodiment of the insulated backpack.

FIG. 1B shows a perspective rear view of an embodiment of the insulated backpack. The rear face of the body 12 includes a pair of parallel straps 17. Each parallel strap of the pair of parallel straps 17 includes a first end and a second end. The first end of each parallel strap of the pair of parallel straps 17 is disposed on the rear face approximate towards the top face of the body 12. The second end of each parallel strap of the pair of parallel straps 17 is disposed on the rear face approximate towards the bottom face of the body 12. The pair of parallel straps 17 allows the user to easily carry the insulated backpack 11. The user may have one or both parallel straps of the pair of parallel straps 17 encircling their shoulder. Additionally, the side face storage pocket 14 may be disposed on each side face of the pair of side faces. The at least one side face storage pocket 14 allows for the user to have easy access to the contents of each side face storage pocket of the at least one side face storage pocket 14 while they are wearing the insulated backpack 31.

Figure 2:
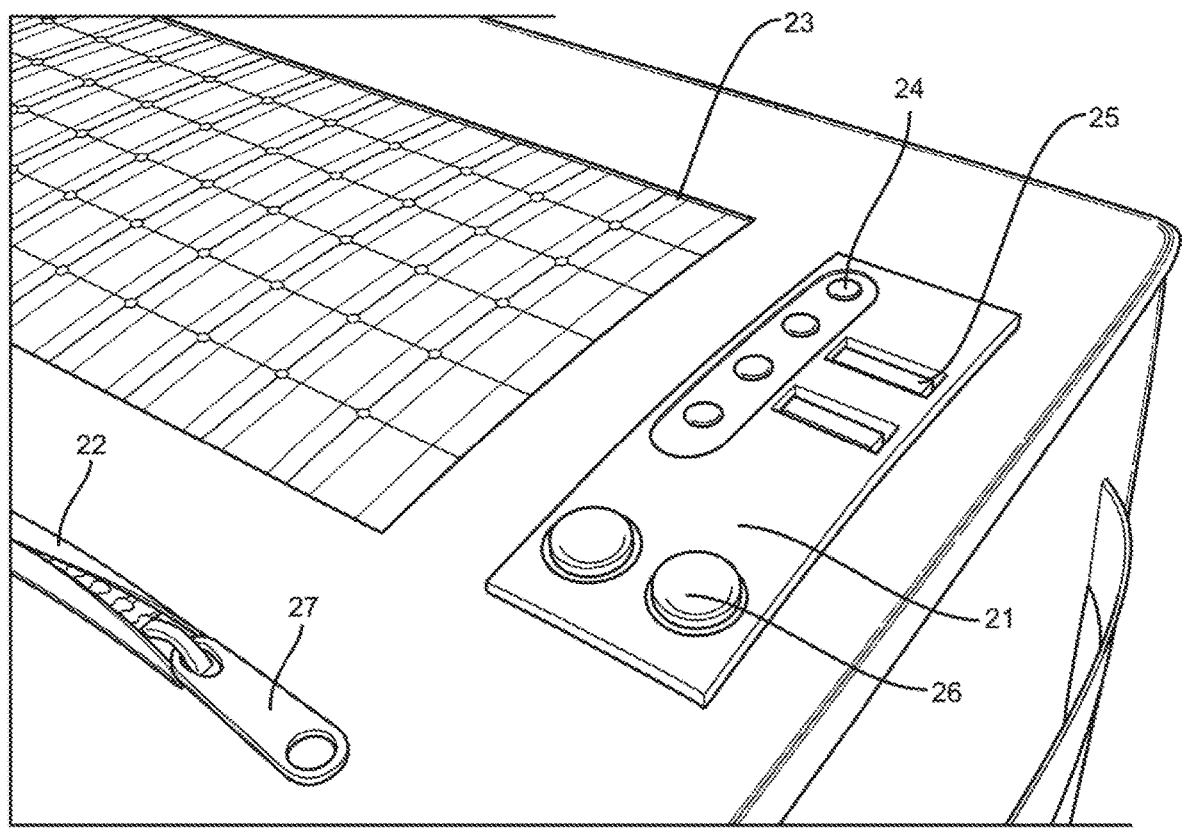
FIG. 2 shows a close-up view of an embodiment of the insulated backpack.

FIG. 2 shows a close-up view of an embodiment of the insulated backpack. The insulated backpack includes the top face 18 that is securable to adjacent parts of the body. A control panel 21 is disposed on an external side of the top face 18. The control panel 21 includes a plurality of USB ports 25, a plurality of lighting elements 24, and at least one actuator 26. The plurality of USB ports 25 are configured to accept, a USB compatible cord. Each USB port of the plurality of USB ports 25 corresponds to an actuator of the at least one actuator 26. Engaging a corresponding actuator will supply power to the desired USB port and allow for an electronic device connected to the insulated backpack via a UBS-compatible cord to receive power. In the shown embodiment, the plurality of lighting elements 24 will illuminate to identify the remaining amount of usable power. The shown embodiment includes four lighting elements of the plurality of lighting elements 24. When all four lighting elements of the plurality of lighting elements 24 are illuminating, there is 75%-100% power available for use of the insulated backpack. When three adjacent lighting elements of the plurality of lighting elements 24 are illuminating, there is 50%-75% power available for use of the insulated backpack. When two adjacent lighting elements of the plurality of lighting elements 24 are illuminating, there is 25%-50% power available for use of the insulated backpack. When one lighting element of the plurality of lighting elements 24 are illuminating, there is 0%-25% power available for use of the insulated backpack. When zero lighting elements of the plurality of lighting elements 24 are illuminating, there is 0% power available for use of the insulated backpack. In one embodiment, the plurality of lighting elements is a LED.

A plurality of solar panels 23 is disposed on an external side of the top face 18. The plurality of solar panels 23 are oriented to capture an optimized amount of light. Once captured, the plurality of solar panels 23 will convert the energy from the light into a reusable power. The plurality of solar panels 23 is operably connected to a power source, such as a battery, for example. The energy that is converted into power by the plurality of solar panels 23 will transfer to the power source. The power source will house the power for the features of the insulated backpack to utilize. Specifically, the power source will supply power to the plurality of USB ports 25 when a UBS-compatible cord is engaged with a USB port of the plurality of USB ports 25. In one embodiment, the insulated backpack may be charged at home using conventional power. In said embodiment, an electrical cord operably connected to the power source may be connected to an electrical system to charge the insulated backpack.

The top face 18 of the body further comprises an internal pocket. The internal pocket includes an aperture 22 disposed on the top face 18. The aperture 22 provides access to the internal pocket. A zipper system 27 encircles the aperture 22. The user may selectively open and close the aperture 22 by engaging the zipper system 27. Disengaging the zipper system 27 provides access to the internal pocket. In one embodiment, the internal pocket is configured to house containers of varying sizes and additional items. The internal pocket is composed of a flexible material to accommodate for the size of the items placed therein.

Figure 3A:
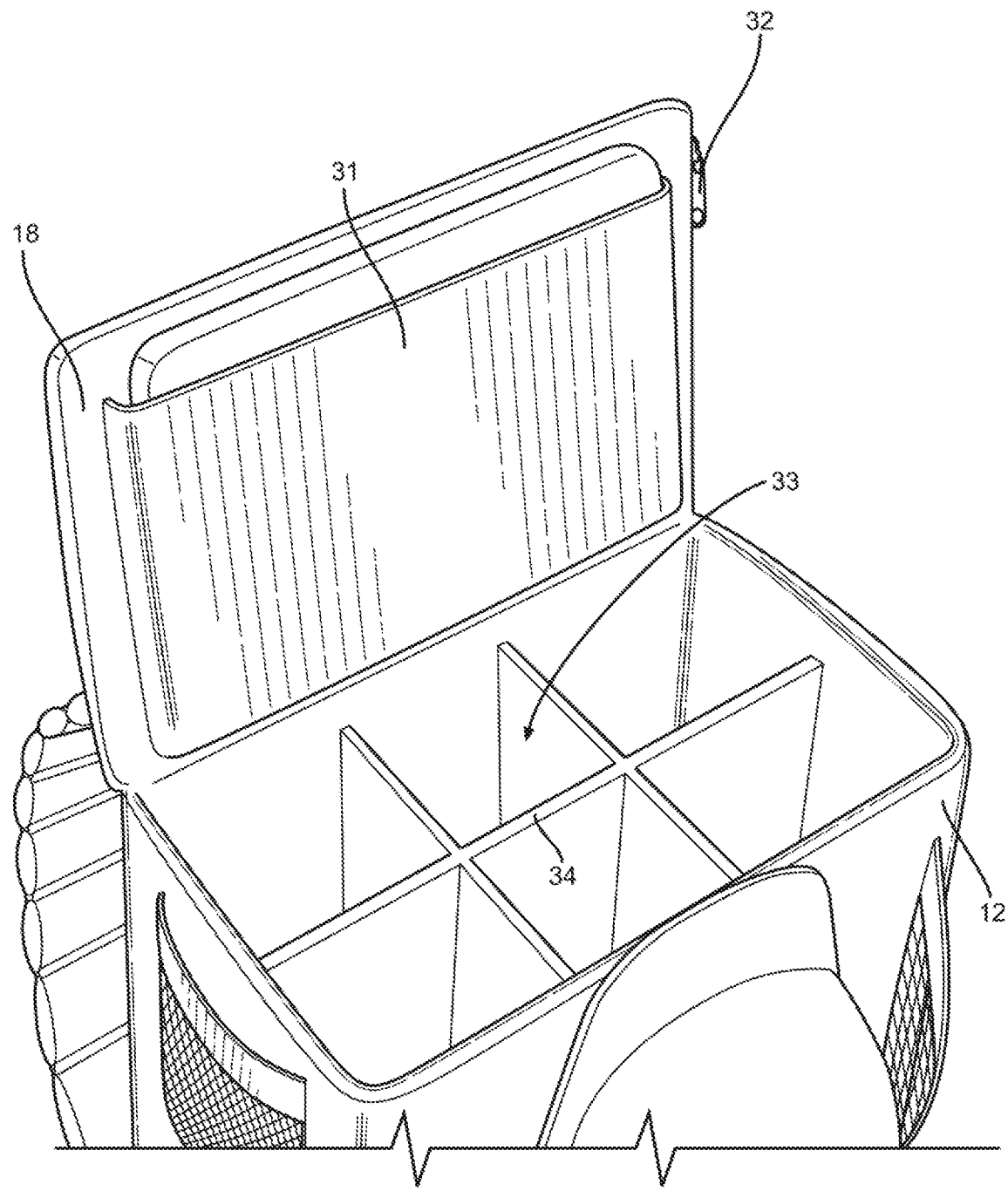
FIG. 3A shows a close-up view of an embodiment of the insulated backpack.

FIG. 3A shows a close-up view of an embodiment of an insulated backpack. To gain access to an upper storage compartment 33, the user may partially detach the top face 18 from the front face and the pair of side faces of the body 12. The top face 18 may be partially detached via a first fastener 32. In the shown embodiment, the first fastener 32 is a zipper. The top face 18 will remain attached to the body 12 of the insulated backpack at the rear face. An internal side of the top face 18 further comprises a pocket 31. The pocket 31 permits additional items to be placed therein. The pocket 31 is only accessible to the user when the top face 18 is partially detached from the body 12. Users may place items with the upper storage compartment 33. While placed within the upper storage compartment 33 items will be able to maintain their desired temperature. The interior walls or the upper storage compartment 33 are composed of an insulating material. Such insulating material provides the necessary insulation to limit the temperature change of items placed therein regardless if the items are placed warm or cold within the upper storage compartment 33. In one embodiment, an ice pack 34 may be placed within the upper storage compartment 33. The ice pack 34 is removable from within the upper storage compartment 33. Moreover, the ice pack 34 is detachable. The ice pack 34 may be placed with n a freezer prior to use. The upper storage compartment 33 further comprises a pair of internal lips. The pair of internal lips are disposed on opposing sided of the upper storage compartment 33. The pair of internal lips provides support to the ice pack 34 when placed within the upper storage compartment 33.

Figure 3B:
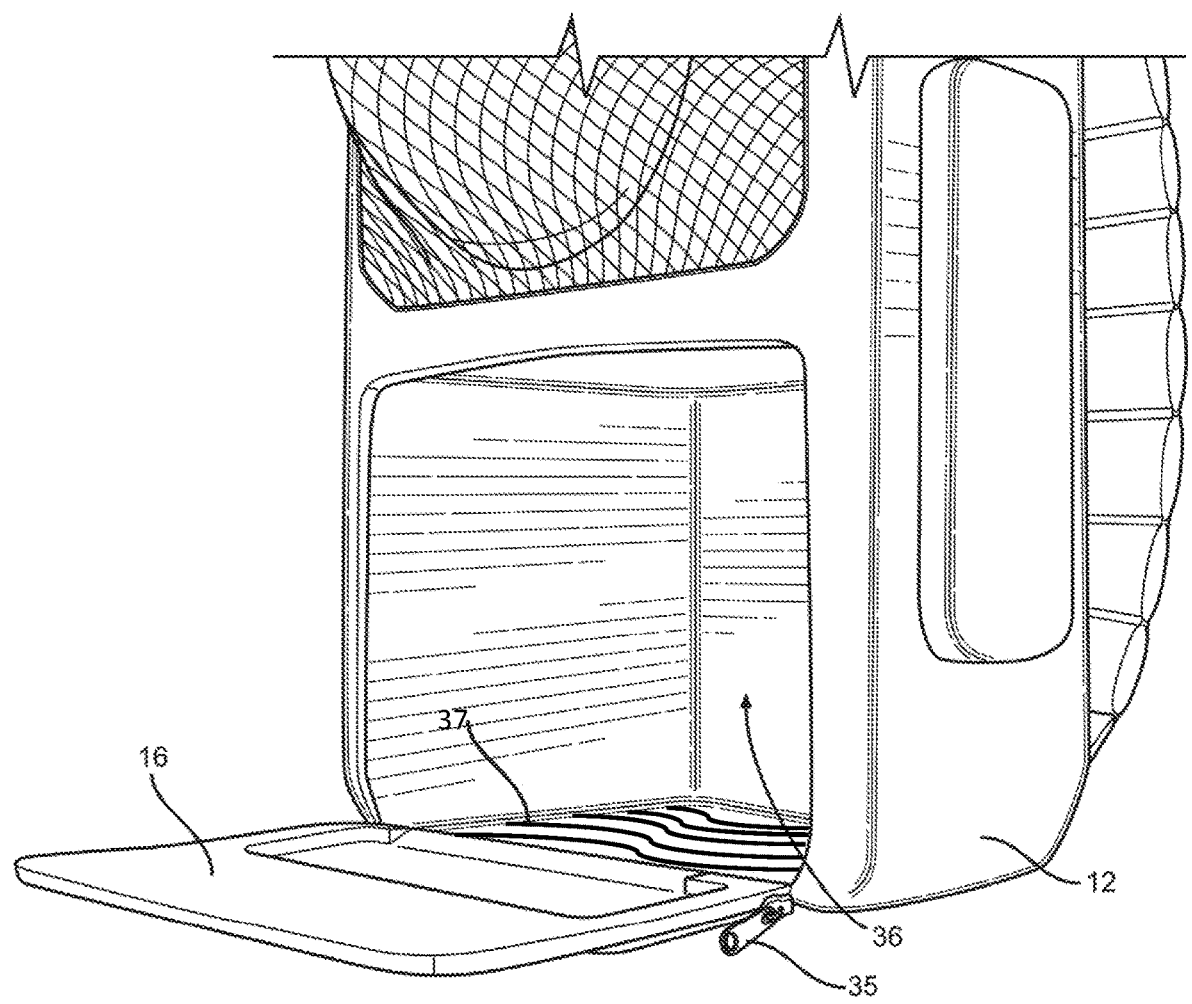
FIG. 3B shows a close-up view of an embodiment of the insulated backpack.

FIG. 3B shows a close-up view of an embodiment of an insulated backpack. The insulated backpack further comprises a lower storage compartment 36. The lower storage compartment 36 is accessible through the front compartment 16 disposed on the front face of the body 12. The front compartment 16 is pivotally attached to the front face via a second fastener 35. In the shown embodiment, the second fastener 35 is a zipper. The front compartment 16 will remain attached to the body 12 of the insulated backpack at the bottom face. Users may place items within the lower storage compartment 36. While placed within the lower storage compartment 36 items will be able to maintain their desired temperature. The interior walls of the lower storage compartment 36 are composed of an insulating material, which may include a foam material, a vacuum air-gap insulation structure, or any other suitable insulating material that maintains the current temperature of items within the lower storage compartment 36. Such insulating material provides the necessary insulation to limit the temperature change of items placed therein regardless if the items are placed warm or cold within the lower storage compartment 36.

The lower storage compartment 36 is independent from the upper storage compartment. The desired temperature of the items placed within the lower storage compartment 36 may be different from the desired temperature of the items placed within the upper storage compartment. This permits a user to place warm temperature food in the lower storage compartment 36 and cold temperature food in the upper storage compartment during a single use of the insulated backpack, or vice versa. Moreover, a user may select to utilize the insulated backpack to transport only hot items or only cold items. In which case, the user may place similarly temperature food in both the upper storage compartment and the lower storage compartment 36.

In one embodiment, the lower storage compartment 36 further comprises a heating element 37. The heating element 37 is operably connected to the power source. When an actuator is engaged, the power supply will power the heating element 37. The power source will allow for the heating element 37 to radiate heat within the lower storage compartment 36 to warm items therein. In one embodiment, the heating element 37 will radiate temperatures up to 170 degrees.

It is therefore submitted that the instant invention has been shown and described in what is considered to be the most practical and preferred embodiments, it is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An insulated backpack, comprising:
   a generally vertical body having a front face, a rear face, a pair of side faces, a top face, and a bottom face;
   a pair of parallel straps disposed on the rear face of the body;
   a plurality of storage pockets disposed on the front face and the pair of side faces of the body;
   wherein the top face of the body is partially removable from the front face and the pair of side faces;
   wherein a first fastener secures the top face to the front face and the pair of side faces;
   wherein an upper storage compartment is accessible when the first fastener disengages the top face from the front face and the pair of side faces;
   a front compartment disposed on the front face of the body;
   wherein the front compartment is pivotally attached to the front face via a second fastener;
   a lower storage compartment which is accessible when the second fastener disengages the front compartment from the front face;
   wherein the lower storage compartment further comprises a heating element;
   a plurality of solar panels disposed on an external side of the top face of the body;
   a control panel disposed on an external side of the top face of the body;
   wherein the control panel further comprises a plurality of USB ports, a plurality of lighting elements, and a plurality of actuators;
   wherein the plurality of solar panels disposed on an external side of the top face of the body are disposed adjacent to the control panel;
   wherein each USB port of the plurality of USB ports corresponds to an actuator of the plurality of actuators;
   wherein the plurality of solar panels is operably connected to a power source;
   wherein the power source is operably connected to the control panel; and
   wherein the second fastener that secures the front compartment to the front face of the body is a zipper;

wherein a generally vertical pocket is disposed on an internal side of the top face of the body; and wherein an aperture disposed on the top face of the body provides access to an internal pocket and a zipper system that encircles the aperture that selectively opens and closes the aperture by engaging the zipper system.

2. The insulated backpack of claim 1, wherein the body is thermally insulated and is composed of a waterproof material with a protectant rubberized rugged material on the bottom face.

3. The insulated backpack of claim 1, wherein each parallel strap of the pair of parallel straps includes a first end disposed towards the top face of the body and a second end disposed towards the bottom face of the body.

4. The insulated backpack of claim 1, wherein the first fastener that secures the top face to the front face and the pair of side faces is a zipper.

5. The insulated backpack of claim 1, wherein the upper storage compartment further comprises an ice pack.

6. The insulated backpack of claim 1, wherein the plurality of actuators are is disposed on the top face of the body.

7. The insulated backpack of claim 1, wherein the plurality of actuators are push buttons.

8. The insulated backpack of claim 1, wherein the plurality of lighting elements indicates the amount of power stored within the power source.

9. The insulated backpack of claim 1, wherein the plurality of lighting elements are LEDs.

10. The insulated backpack of claim 1, wherein the plurality of lighting elements are four lighting elements.

11. The insulated backpack of claim 10, wherein when the four lighting elements of the plurality of lighting elements are illuminating, there is 75%-100% power available for use of the insulated backpack, when three adjacent lighting elements of the plurality of lighting elements are illuminating, there is 50%-75% power available for use of the insulated backpack, when two adjacent lighting elements of the plurality of lighting elements are illuminating, there is 25%-50% power available for use of the insulated backpack, when one lighting element of the plurality of lighting elements are illuminating, there is 0%-25% power available for use of the insulated backpack, and when zero lighting elements of the plurality of lighting elements are illuminating, there is 0% power available for use of the insulated backpack.

12. The insulated backpack of claim 1, wherein the vertical body is composed of a flexible material to accommodate for a plurality of items of varying sizes.

13. The insulated backpack of claim 1, wherein the heating element is operably connected to the power source.

14. The insulated backpack of claim 1, wherein the heating element will radiate temperatures up to 170 degrees.

15. The insulated backpack of claim 1, wherein the plurality of solar panels are oriented to capture an optimized amount of light, that once captured, the plurality of solar panels will convert energy from the optimized amount of light into a reusable power and is operably connected to a power source.

16. The insulated backpack of claim 1, further comprising a side compartment disposed on the side face of the body that includes a covering that secures the items placed within the side compartment.

17. The insulated backpack of claim 16, wherein the covering is selectively detached via a fastener attachment.

* * * * *